(12) United States Patent
Ziegler et al.

(10) Patent No.: US 11,977,188 B2
(45) Date of Patent: May 7, 2024

(54) METHOD AND DEVICE FOR CALIBRATING A VEHICLE SENSOR

(71) Applicant: Robert Bosch GmbH, Stuttgart (DE)

(72) Inventors: David Ziegler, Stuttgart (DE); Stephan Dorenkamp, Esslingen (DE)

(73) Assignee: ROBERT BOSCH GMBH, Stuttgart (DE)

(*) Notice: Subject to any disclaimer, the term of this patent is extended or adjusted under 35 U.S.C. 154(b) by 918 days.

(21) Appl. No.: 17/009,996

(22) Filed: Sep. 2, 2020

(65) Prior Publication Data

US 2021/0124033 A1    Apr. 29, 2021

(30) Foreign Application Priority Data

Oct. 24, 2019   (DE) .................. 102019216399.8

(51) Int. Cl.
*B60W 50/00*      (2006.01)
*G01S 7/497*      (2006.01)
*G01S 7/40*       (2006.01)

(52) U.S. Cl.
CPC .... *G01S 7/4972* (2013.01); *B60W 2050/0075* (2013.01); *G01S 7/403* (2021.05)

(58) Field of Classification Search
CPC ........... G06T 2207/20061; G06T 7/80; G06V 10/753; G06V 10/48; G06V 30/18067; G06V 30/19033; B60W 2050/0075; B60W 2050/0083; B60W 2050/0215; B60R 2300/402; B60R 11/04; G01S 7/4972; G01S 7/409; G01S 7/497; G01S 7/4026; G01S 7/403; G01S 7/4034
See application file for complete search history.

(56) References Cited

U.S. PATENT DOCUMENTS

| | | | |
|---|---|---|---|
| 5,922,036 A * | 7/1999 | Yasui ..................... | G06V 10/48 382/104 |
| 6,265,991 B1 * | 7/2001 | Nishiwaki ............... | G01S 7/295 340/904 |
| 6,816,109 B1 * | 11/2004 | Schwartz .............. | G01S 13/524 382/281 |
| 2014/0347206 A1 * | 11/2014 | Steinlechner ............. | G01S 7/40 342/5 |

(Continued)

FOREIGN PATENT DOCUMENTS

| | | |
|---|---|---|
| DE | 102013209494 A1 | 11/2014 |
| EP | 1947473 A2 | 7/2008 |

*Primary Examiner* — Khoi H Tran
*Assistant Examiner* — Tanner L Cullen
(74) *Attorney, Agent, or Firm* — NORTON ROSE FULBRIGHT US LLP; Gerard A. Messina

(57) ABSTRACT

A method for calibrating a vehicle sensor of a motor vehicle. The method includes the steps: ascertaining, by way of the vehicle sensor, sensor data at a plurality of measurement times, the motor vehicle moving in relation to objects in surroundings of the motor vehicle; computing object positions of the objects on the basis of the ascertained sensor data; computing a Hough transformation on the basis of the computed object positions; ascertaining an alignment of the vehicle sensor in relation to a driving axis of the motor vehicle on the basis of the computed Hough transformation; and calibrating the vehicle sensor on the basis of the ascertained alignment of the vehicle sensor in relation to the driving axis of the motor vehicle.

10 Claims, 5 Drawing Sheets

(56) References Cited

U.S. PATENT DOCUMENTS

| | | | | |
|---|---|---|---|---|
| 2015/0363669 A1* | 12/2015 | Aviv | .................. | G06V 10/94 |
| | | | | 382/199 |
| 2018/0321378 A1* | 11/2018 | Sudhakar | ............ | G01S 13/4454 |
| 2020/0209369 A1* | 7/2020 | Koch | ................... | G01S 7/4972 |

* cited by examiner

METHOD AND DEVICE FOR CALIBRATING A VEHICLE SENSOR

CROSS REFERENCE

The present application claims the benefit under 35 U.S.C. § 119 of German Patent Application No. 102019216399.8 filed on Oct. 24, 2019, which is expressly incorporated herein by reference in its entirety.

FIELD

The present invention relates to a method for calibrating a vehicle sensor of a motor vehicle. Furthermore, the present invention relates to a corresponding device for calibrating a vehicle sensor of a motor vehicle.

BACKGROUND INFORMATION

Driver assistance systems access sensor data of vehicle sensors. In order for the driver assistance systems to be already available upon leaving the factory, the vehicle sensors have to be calibrated. For calibration, the motor vehicle may move toward a suitable target on a wheel alignment stand at a measured driving axis. The stationary measurement of the driving axis and the calibration building thereon may be time-consuming and costly, however. In particular, ascertaining the alignment of the sensors in relation to the driving axis of the motor vehicle in the production environment may prove to be problematic, since short downtimes are to be expected. The complexity of static methods may thus increase linearly with each sensor, which may prove to be difficult for a multisensor system made up of many sensors. Tracking objects is moreover very complex. An "object" may be understood as each point with which coordinates may be associated on the basis of the sensor data, such as radar reflections or the like.

In the case of dynamic calibration of the sensors with the aid of trilateration via stationary objects, it may prove to be difficult to monitor the positions of the objects in relation to one another to ensure that the object is not moved.

A method for ascertaining a misalignment of a radar sensor is described in German Patent Application No. DE 10 2013 209 494 A1, measured angles being compared to angles computed on the basis of a distance measurement.

Furthermore, a method and a measured section for aligning a distance sensor are described in European Patent No. EP 1 947 473 A2. A sighting pole is situated on a roadway for this purpose.

SUMMARY

The present invention provides a method for calibrating a vehicle sensor of a motor vehicle having the features of Patent and a device for calibrating a vehicle sensor of a motor vehicle.

Preferred specific embodiments of the present invention are described herein.

According to a first aspect, the present invention provides a method for calibrating a vehicle sensor of a motor vehicle. In accordance with an example embodiment of the present invention, the vehicle sensor ascertains sensor data at a plurality of measurement times, the motor vehicle moving in relation to objects in surroundings of the motor vehicle. Object positions are computed on the basis of the ascertained sensor data. A Hough transformation is computed on the basis of the computed object positions. An alignment of the vehicle sensor in relation to a driving axis of the motor vehicle is ascertained on the basis of the computed Hough transformation. The vehicle sensor is calibrated on the basis of the ascertained alignment of the vehicle sensor in relation to the driving axis of the motor vehicle.

According to a second aspect, the present invention provides a device for calibrating a vehicle sensor of a motor vehicle, including an interface, a computing device, and a calibration unit. In accordance with an example embodiment of the present invention, the interface receives sensor data, which were ascertained by the vehicle sensor at a plurality of measurement times, while the motor vehicle moves in relation to objects in surroundings of the motor vehicle. The computing device computes object positions on the basis of the ascertained sensor data. The computing device computes a Hough transformation on the basis of the computed object positions. The computing device furthermore computes an alignment of the vehicle sensor in relation to a driving axis of the motor vehicle on the basis of the computed Hough transformation. The calibration unit calibrates the vehicle sensor on the basis of the ascertained alignment of the vehicle sensor in relation to the driving axis of the motor vehicle.

The present invention enables a dynamic calibration, so that the calibration process may be carried out without downtimes and without alignment of the driving axis while driving. Thus, for example, the drive from the factory to the parking area or transporter may be used for calibration. Therefore, the present invention may be used to optimize the process time in the factory.

The calibration of the vehicle sensor according to the present invention may also manage without measurement of (radial) velocities, yaw rates, or further signals. Tracking of the objects is also not required. Furthermore, the method is more accurate in particular in the elevation direction than static methods.

Finally, the method is simpler to implement. Despite having good results, the method is not dependent on fixed objects, thus costs may be reduced, since the objects do not have to be continuously monitored with respect to their placement position.

Furthermore, static angle deviations may also be corrected, which are induced by surfaces in front of the radar (for example, covers), through which it emits its radiation. Furthermore, consistently sized refraction influences that are caused by front casings are corrected.

According to another specific embodiment of the method for calibrating a vehicle sensor in accordance with the present invention, the vehicle sensor includes at least one of a radar sensor, a LIDAR sensor, an ultrasonic sensor, an infrared sensor, and a camera sensor. The present invention is applicable for all surroundings-scanning sensors without additional pieces of external information.

According to another specific embodiment of the method for calibrating a vehicle sensor in accordance with the present invention, a velocity and a yaw rate of the vehicle are furthermore determined to carry out post-filtering of the alignment of the vehicle sensor in relation to the driving axis of the motor vehicle, i.e., with respect to an alignment error angle in azimuth and elevation directions.

According to another specific embodiment of the method for calibrating a vehicle sensor in accordance with the present invention, the computation of a Hough transformation includes the creation of a sinogram.

According to another specific embodiment of the method for calibrating a vehicle sensor in accordance with the present invention, weighting of the object positions is carried out during the creation of the sinogram. The weighting may result in better results, since quality features of the object positions which are associated with the objects may be taken into consideration. Pieces of device information of the vehicle sensors may be taken into consideration for the weighting, in particular a range of the sensors or an angle or distance dependency of the quality of the sensor data ascertained by the vehicle sensor. The more reliable the data are, the higher the corresponding pieces of information are weighted.

According to another specific embodiment of the method for calibrating a vehicle sensor in accordance with the present invention, a main direction of the object positions is ascertained on the basis of the sinogram by methods estimating intensity maxima, for example, by core density estimation within the Hough space, by which the ascertainment of the alignment of the vehicle sensor in relation to the driving axis of the motor vehicle includes the computation of an angle between the main direction and the driving axis of the motor vehicle.

According to another specific embodiment of the method for calibrating a vehicle sensor in accordance with the present invention, an azimuth angle and an elevation angle are computed, which extend between corresponding main directions and the driving axis of the motor vehicle.

According to another specific embodiment of the method for calibrating a vehicle sensor in accordance with the present invention, the sinogram includes intensity values ascertained on the basis of the sensor data, a histogram being computed by application of a threshold value function to the intensity values. The histogram is dependent on an azimuth and/or elevation angle in relation to the driving axis of the motor vehicle. The alignment of the vehicle sensor in relation to the driving axis of the motor vehicle is ascertained on the basis of the computed histogram.

According to another specific embodiment of the method for calibrating a vehicle sensor in accordance with the present invention, the alignment of the vehicle sensor in relation to the driving axis of the motor vehicle is ascertained by applying a filter function to the histogram.

According to another specific embodiment of the method for calibrating a vehicle sensor in accordance with the present invention, a main direction of the object positions is ascertained by applying the filter function to the histogram. The ascertainment of the alignment of the vehicle sensor in relation to the driving axis of the motor vehicle includes the computation of an angle between the main direction and the driving axis of the motor vehicle.

According to another specific embodiment of the method for calibrating a vehicle sensor in accordance with the present invention, the computation of the Hough transformation is carried out in spherical coordinates. The computation preferably takes place without prior computation of a grid. The use of spherical coordinates has the advantage that the positions of the objects are often already provided in spherical coordinates, so that they may be used without transformation into the Cartesian coordinate system. The performance may thus be increased. A formulation in the spherical coordinate system enables greater accuracy, which is to be compared to the accuracy of a radon transformation, but is significantly higher in performance with limited resource availability, since in comparison to the Cartesian formulation of the Hough transformation, the object positions are not reduced to the resolution of the grid size in the Cartesian space, but rather may be specified continuously.

According to another specific embodiment of the method for calibrating a vehicle sensor in accordance with the present invention, a computation of an error of the alignment of the vehicle sensor in relation to the driving axis of the motor vehicle may be carried out by an error propagation method.

According to another specific embodiment of the method for calibrating a vehicle sensor in accordance with the present invention, the calibration of the vehicle sensor may be used continuously while driving. A continuous calibration is thus possible.

DETAILED DESCRIPTION OF EXAMPLE EMBODIMENTS

Figure 1:
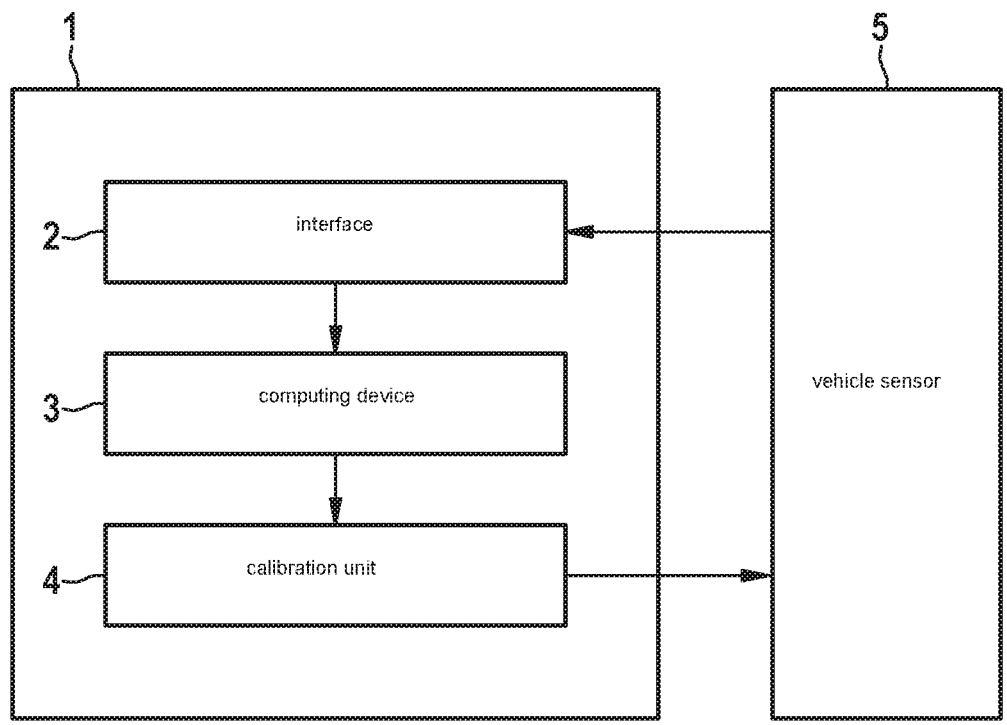
FIG. 1 shows a schematic block diagram of a device for calibrating a vehicle sensor of a motor vehicle according to one specific example embodiment of the present invention.

FIG. 1 shows a schematic block diagram of a device 1 for calibrating a vehicle sensor 5 of a motor vehicle. Device 1 includes an interface 2, which is coupled to vehicle sensor 5, to receive sensor data from it. The sensor data are generated on the basis of measurements of vehicle sensor 5 at a plurality of measurement times. For example, vehicle sensor 5 may carry out measurements at predefined time intervals. Vehicle sensor 5 may be a surroundings-detecting sensor, for example, a radar sensor, a LIDAR sensor, an ultrasonic sensor, an infrared sensor, or a camera sensor. During the measurements, the motor vehicle moves in relation to the objects in surroundings of the motor vehicle. In this case, this is preferably a linear relative movement at constant velocity. For example, the objects are fixedly positioned, while the vehicle moves at constant velocity straight ahead on a level underlying surface. In this case, the driving axis corresponds to the longitudinal axis of the motor vehicle. In principle, however, accelerations or steering movements of the vehicle may also be read out by sensors and taken into consideration in the computation.

Device 1 furthermore includes a computing device 3, which is coupled to interface 2 and further evaluates the received sensor data. Computing device 3 may generate a grid in a vehicle coordinate system of the motor vehicle having a predefined grid size. In other specific embodiments, for example, with a computation in spherical coordinates, the computation of the grid may also be omitted.

On the basis of the sensor data, computing device 3 computes object positions which specify the position of the objects in relation to the motor vehicle.

Computing device 3 computes object positions of the objects. The positions of the object at various points in time are detected due to the movement of the vehicle in relation to the objects, so that a "flow" of the objects is ascertained. If a grid is used, each object is classified multiple times in the grid, since a particular position of the object is ascertained for each measurement time. The object positions may also be referred to as "locations." Multiple locations are thus associated with each object.

Computing device 3 computes a Hough transformation for each partial measuring period, for example, on the basis of the grid having the object positions for the partial measuring period, i.e., the object positions are transformed into a dual space or Hough space. A sinogram is thus generated.

The determination of the main directions via Hough transformation in a Cartesian coordinate system takes place on the basis of the following formula:

$$r\_n = x \cdot \cos(\theta\_n) + y \cdot \sin(\theta\_n),$$

r_n specifying the ordinate coordinate and el n the abscissa coordinate of a Hough sinogram point. Furthermore, x and y denote the Cartesian coordinates of the object positions.

When creating the sinogram, computing device 3 may carry out a weighting of the object positions categorized in the grid. The weighting factors may be computed on the basis of quality features of the particular object positions. In particular, the weighting factors may be determined on the basis of sensor properties of vehicle sensor 5 and are dependent, for example, on a distance of the object position from the position of vehicle sensor 5.

The Hough algorithm modified by the weighting may have the following form:

```
max_d := sqrt((imageheight)^2 + (imagewidth^2))
min_d := max _d * (-1)
houghSpace[0...π][min_d...max_d] := 0
foreach pixel !=0 do
  for α := 0 to π do
    d := pixel_x * cos(α) + pixel_y * sin (α)
    houghSpace[α][d] := houghSpace[α][d] + weightMatrix[pixel]
  end
end
```

Alternatively, computing device 3 may ascertain the main direction of the object positions classified in the grid by core density estimation on the basis of the sinogram.

Instead of a computation in Cartesian coordinates, computing device 3 may also compute the Hough transformation in spherical coordinates, i.e., on the basis of the following formula:

$$r\_n(\xi\_n) = d\_R \cdot \sin(\xi\_R - \xi\_n),$$

ξ_r denoting one of φ_R and θ_R. The ordinate and abscissa coordinates (r_n, ξ_n) of the Hough diagram may be computed by radial distance d_R of the object position and angle θ_R of the object position (azimuth or elevation). In accordance with the computed (r_n, ξ_n) coordinates for the Hough diagram, the weightings of the associated object positions (d_R, θ_R) are summed over the Hough sinogram. An arbitrarily precise quantification or classification of r_n, ξ_n may be carried out here, which determines the resolution of the sinogram.

The sinogram includes intensity values, to which computing device 3 applies a threshold value function to compute a histogram. The histogram is a function of a possible azimuth or elevation angle of vehicle sensor 5 in relation to the driving axis of the motor vehicle. Computing device 3 applies a filter function to the histogram to ascertain a main direction of the object positions classified in the grid. The actual azimuth angle or elevation angle of vehicle sensor 5 corresponds to the angle between the main direction and the driving axis of the motor vehicle.

Device 1 furthermore includes a calibration unit 4, which is coupled to computing device 3 and calibrates vehicle sensor 5 on the basis of the alignment of vehicle sensor 5 ascertained by computing device 3. For example, the actual alignment of vehicle sensor 5 may be taken into consideration in all measured values of vehicle sensor 5. Furthermore, it may be provided that an alignment error is computed, i.e., a deviation of the computed alignment of vehicle sensor 5 from an expected alignment.

Figure 2:
FIG. 2 shows a grid including object positions for determining an azimuth alignment.

FIG. 2 shows a grid including object positions for determining an azimuth alignment for illustration. Each measuring point shown in the grid corresponds to a measuring signal which is associated with the spatial region corresponding to the grid point in the surroundings of the motor vehicle by computing device 3 on the basis of the sensor data. The measuring points or object positions are on main directions parallel to one another for each object. Main direction A2 for one of the objects is shown as an example. The object positions along this main direction A2 correspond to measurements of the object at various measurement times. Furthermore, driving axis A1 of the motor vehicle is shown. FIG. 2 corresponds to a view from above of the vehicle, so that an azimuth angle β_AZ lies between main direction A2 and driving axis A1.

Figure 3:
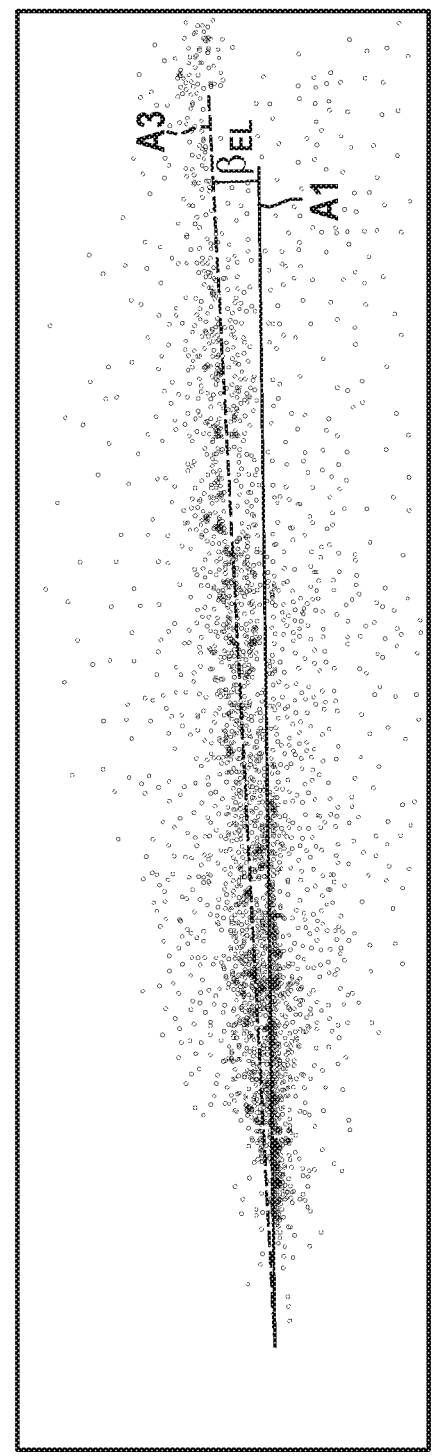
FIG. 3 shows a grid including object positions for determining an elevation alignment.

FIG. 3 shows a grid having object positions for determining an elevation alignment. FIG. 3 thus corresponds to a lateral view, so that an elevation angle β_EL lies between a main direction A3 and driving axis A1.

Figure 4:
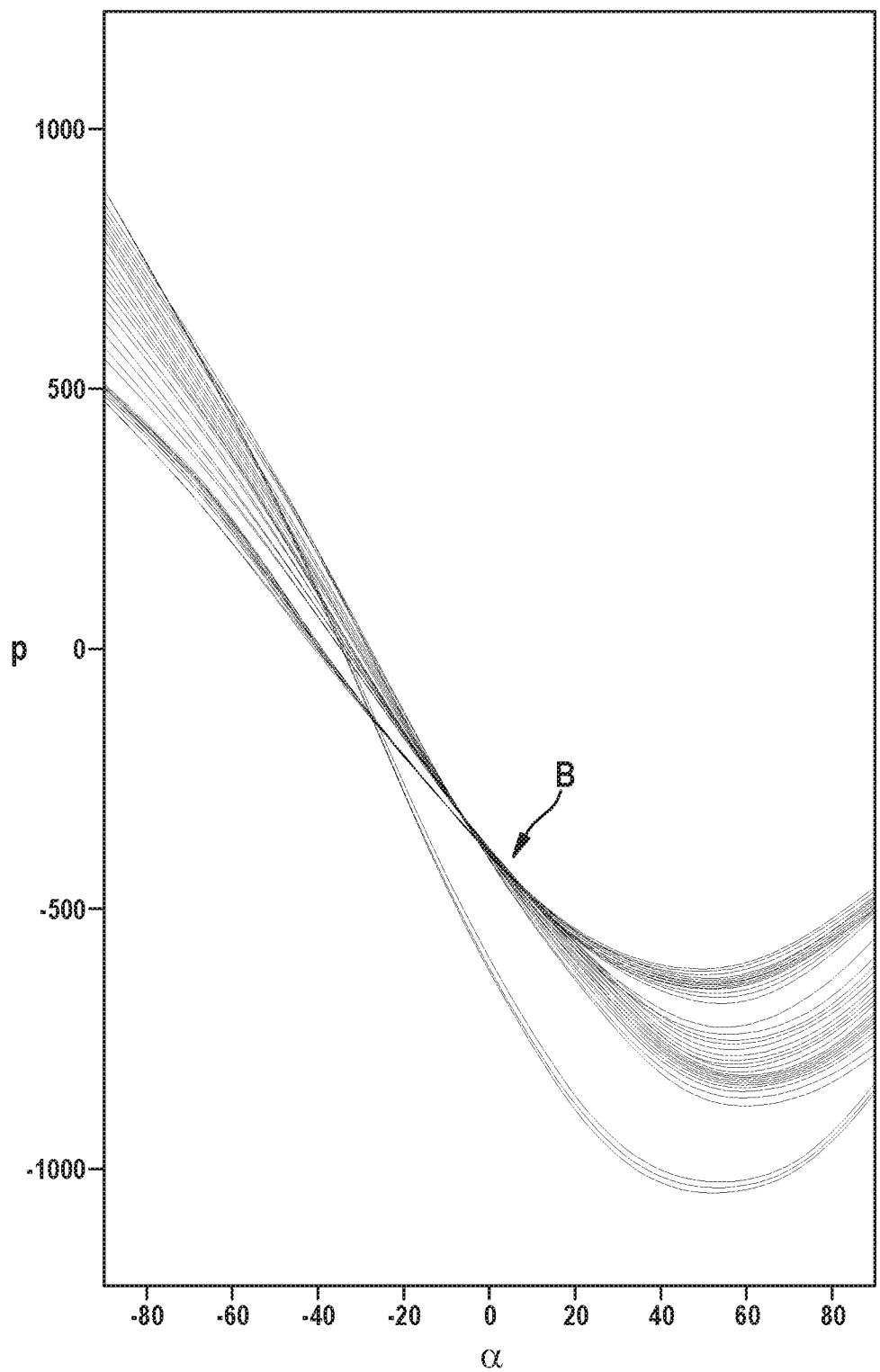
FIG. 4 shows an exemplary sonogram.

FIG. 4 shows a sinogram obtained by Hough transformation for the case of a single object. Multiple essentially sinusoidal curves result, which intersect in a point B of highest intensity. For multiple objects, further curves shifted in parallel would result, which would also intersect in a point of highest intensity for each object. The sinogram shows projection position P as a function of an angle α, such as an elevation angle or azimuth angle. Angles α with higher intensity correspond to a greater number of measuring points which lie on the associated straight line.

Figure 5:
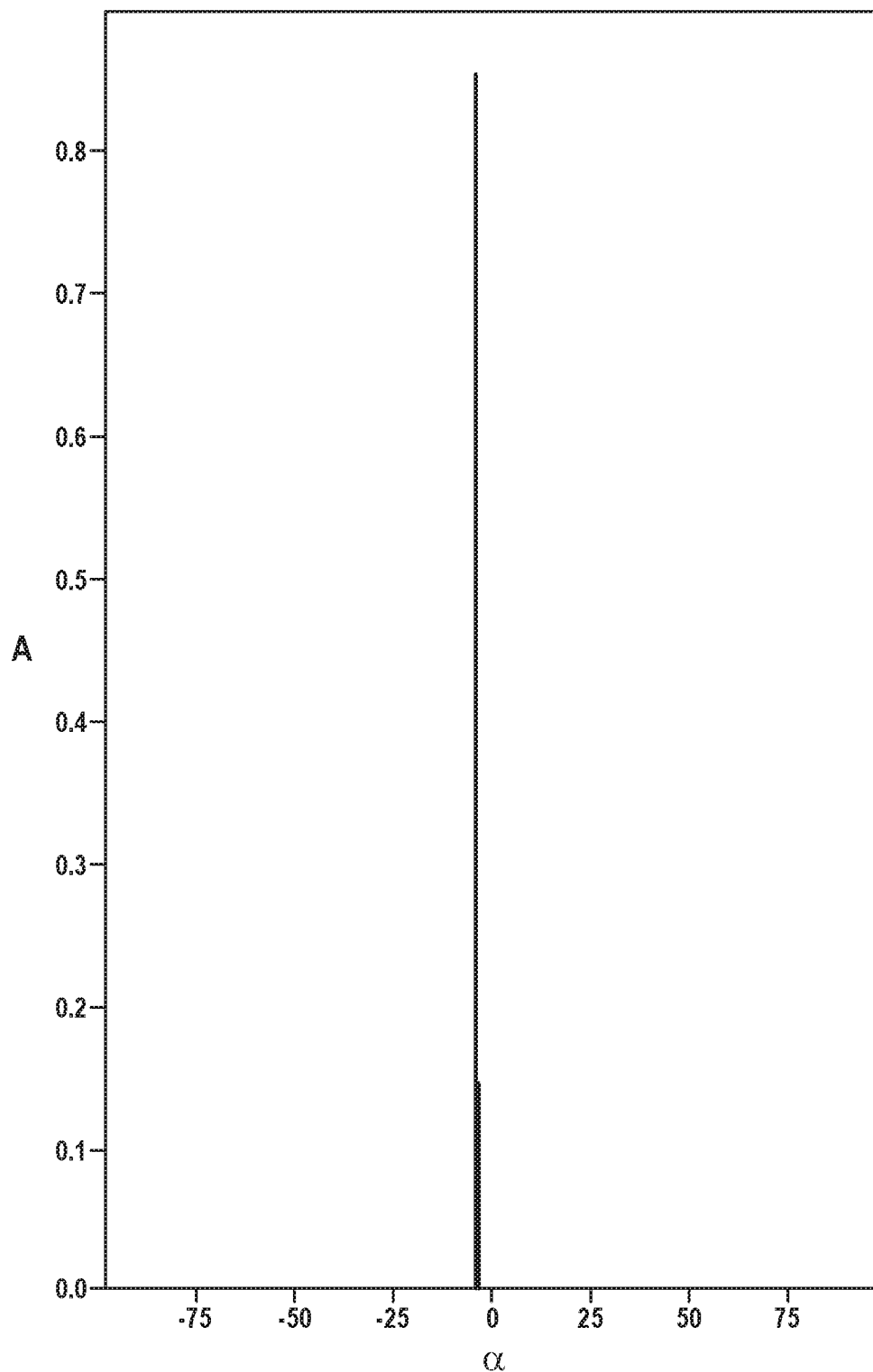
FIG. 5 shows an exemplary histogram.

FIG. 5 shows an exemplary histogram, which is computed with application of a threshold value function to the intensity values. For each angle α, the intensities are summed over all projection positions P, i.e., r_n, only points being considered whose intensity exceeds a predefined threshold value. The corresponding histogram results in a maximum of summed intensity A for a specific angle α. This angle corresponds to the corresponding angle between main direction A2, A3 and driving axis A1 of the motor vehicle, i.e., for example, the actual elevation angle or azimuth angle. The summed intensity or total intensity corresponds to a total weighting of associated angle α and may be computed with the aid of a filter function. The ascertainment of the angle may be computed using an angle estimation method, in particular a Kalman filter, averaging method, or the like.

Figure 6:
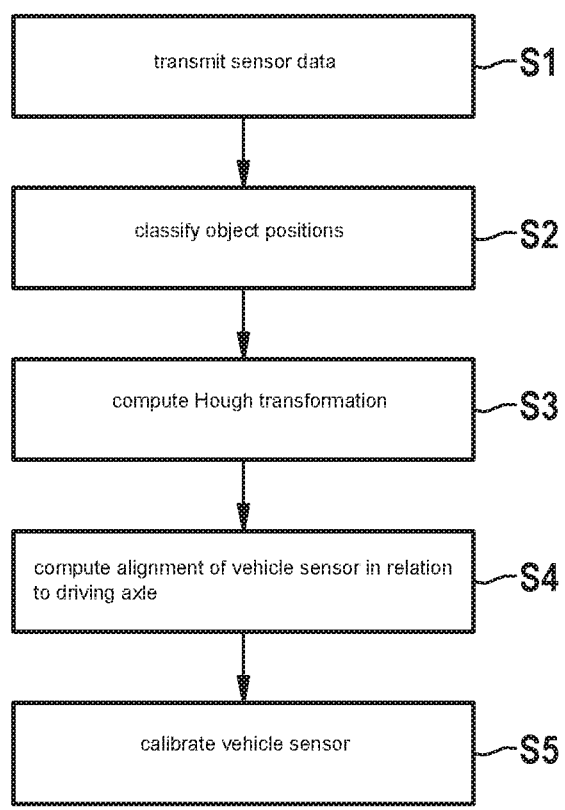
FIG. 6 shows a flow chart of a method for calibrating a vehicle sensor of a motor vehicle according to one specific example embodiment of the present invention.

FIG. 6 shows a flow chart of a method for calibrating a vehicle sensor 5 of a motor vehicle according to one specific embodiment of the present invention.

In a first method step S1, a vehicle sensor 5 transmits sensor data, which are recorded at a plurality of measurement times, while the motor vehicle moves in relation to objects in surroundings of the motor vehicle. The motor vehicle and the objects may in particular move linearly toward one another at constant velocity.

In a second method step S2, object positions are classified in a grid in a vehicle coordinate system of the motor vehicle on the basis of the ascertained sensor data. Each object is classified multiple times, i.e., for each measurement time, the corresponding coordinates ("locations") are entered in the grid.

In the case of other computations, for example, in spherical coordinates, generating the grid may be omitted.

In a third method step S3, a Hough transformation is computed on the basis of the grid including the object positions. A sinogram may be computed for this purpose, weighting of the object positions being able to be carried out. The Hough transformation may be computed in Cartesian coordinates or in spherical coordinates.

In a fourth method step S4, an alignment of vehicle sensor 5 in relation to a driving axis A1 of the motor vehicle is computed on the basis of the computed Hough transformation. For this purpose, a core density estimation may be carried out to determine a main direction. Alternatively, by application of a threshold value function to the intensity values of the sinogram, a histogram may be computed, which is dependent on an azimuth and/or elevation angle in relation to the driving axis of the motor vehicle. The alignment of vehicle sensor 5 in relation to the driving axis of the motor vehicle is ascertained on the basis of the computed histogram. A filter function may be applied to the histogram in this case.

In a fifth method step S5, vehicle sensor 5 is calibrated on the basis of the ascertained alignment of vehicle sensor 5 in relation to driving axis A1 of the motor vehicle.

What is claimed is:

1. A method for calibrating a vehicle sensor of a motor vehicle, comprising the following steps:
    ascertaining, using the vehicle sensor, sensor data at a plurality of measurement times, while the motor vehicle moves in relation to at least one object in surroundings of the motor vehicle, such that the sensor data includes a plurality of data points for a respective one of the at least one object, each of the data points corresponding to a respective one of the plurality of measurement times;
    correlating each of the data points with a respective object position of the respective one of the at least one object to obtain a set of correlated object positions of the respective one of the at least one object;
    converting the set of correlated object positions, by a Hough transformation, into a plurality of Hough graphs that all (a) correspond to the respective one of the at least one object and (b) are relative to a graph axis whose coordinates each correspond to a respective one of a plurality of angles from a driving axis of the motor vehicle, so that the graphs include a respective plurality of data points for each of at least a subset of the plurality of angles, wherein, for each angle of the at least the subset, the respective plurality of data points includes a respective data point from each of the graphs;
    based on differences between respective combinations of the respective plurality of data points of different ones of the at least the subset, selecting a single one of the angles of the at least the subset as an alignment angle of the vehicle sensor in relation to the driving axis of the motor vehicle; and
    calibrating the vehicle sensor based on the selected alignment angle of the vehicle sensor in relation to the driving axis of the motor vehicle.

2. The method as recited in claim 1, wherein the motor vehicle and the at least one object in the surroundings of the motor vehicle carry out a linear relative movement at constant velocity.

3. The method as recited in claim 1, wherein each of the Hough graphs is a respective sinogram.

4. The method as recited in claim 3, wherein a weighting of the object positions of the set of correlated object positions is carried out during the creation of the sinogram.

5. The method as recited in claim 3, wherein the selection of the alignment angle is a selection of a main direction of the set of correlated object positions is based on a determination of intensity maxima of the sinograms.

6. The method as recited in claim 3, wherein the sinograms graph intensity values ascertained based on the sensor data, a histogram being computed by application of a threshold value function to the intensity values, which is dependent on a possible azimuth and/or elevation angle in relation to the driving axis of the motor vehicle, and the selecting of the single one of the angles being performed based on the computed histogram.

7. The method as recited in claim 6, wherein the selecting of the single one of the angles is performed by application of a filter function to the histogram.

8. The method as recited in claim 7, wherein the selection of the alignment angle is a selection of a main direction of the set of correlated object positions.

9. The method as recited in claim 1, wherein the Hough transformation is carried out in spherical coordinates.

10. A device for calibrating a vehicle sensor of a motor vehicle, comprising:
    a processor; and
    an input interface;
    wherein the processor is configured to:
        receive, via the input interface, sensor data ascertained by the vehicle sensor at a plurality of measurement times, while the motor vehicle moves in relation to at least one object in surroundings of the motor vehicle, such that the sensor data includes a plurality of data points for a respective one of the at least one object, each of the data points corresponding to a respective one of the plurality of measurement times;
        correlate each of the data points with a respective object position of the respective one of the at least one object to obtain a set of correlated object positions of the respective one of the at least one object;
        convert the set of correlated object positions, by a Hough transformation, into a plurality of Hough graphs that all (a) correspond to the respective one of the at least one object and (b) are relative to a graph axis whose coordinates each correspond to a respective one of a plurality of angles from a driving axis of the motor vehicle, so that the graphs include a respective plurality of data points for each of at least a subset of the plurality of angles, wherein, for each angle of the at least the subset, the respective plurality of data points includes a respective data point from each of the graphs;
        based on differences between respective combinations of the respective plurality of data points of different ones of the at least the subset, selecting a single one of the angles of the at least the subset as an alignment angle of the vehicle sensor in relation to the driving axis of the motor vehicle; and
        calibrate the vehicle sensor based on the selected alignment angle of the vehicle sensor in relation to the driving axis of the motor vehicle.

* * * * *